US010315954B2

(12) United States Patent
Pianaro et al.

(10) Patent No.: US 10,315,954 B2
(45) Date of Patent: Jun. 11, 2019

(54) GEOPOLYMER CEMENT PRODUCED FROM RECYCLED GLASS AND METHOD FOR PRODUCING SAME

(71) Applicants: UNIVERSIDADE ESTADUAL DE PONTA GROSSA, Ponta Grossa (BR); AGUIA SISTEMAS DE ARMAZENAGEM S/A, Ponta Grossa (BR)

(72) Inventors: Sidnei Antonio Pianaro, Ponta Grossa (BR); Gino Capobianco, Ponta Grossa (BR)

(73) Assignees: UNIVERSIDADE ESTADUAL DE PONTA GROSSA, Ponta Grossa—Paraná (BR); AGUIA SISTEMAS DE ARMAZENAGEM S/A, Ponta Grossa—Paraná (BR)

( * ) Notice: Subject to any disclaimer, the term of this patent is extended or adjusted under 35 U.S.C. 154(b) by 139 days.

(21) Appl. No.: 15/106,744

(22) PCT Filed: Dec. 22, 2014

(86) PCT No.: PCT/BR2014/000452
§ 371 (c)(1),
(2) Date: Jun. 20, 2016

(87) PCT Pub. No.: WO2015/089611
PCT Pub. Date: Jun. 25, 2015

(65) Prior Publication Data
US 2016/0318803 A1  Nov. 3, 2016

(30) Foreign Application Priority Data

Dec. 20, 2013 (BR) ...................... BR1020130330140

(51) Int. Cl.
| C04B 14/04 | (2006.01) |
| C04B 22/06 | (2006.01) |
| C04B 28/00 | (2006.01) |
| C04B 14/10 | (2006.01) |
| C04B 14/42 | (2006.01) |
| C04B 16/06 | (2006.01) |
| C04B 111/00 | (2006.01) |

(52) U.S. Cl.
CPC ............ *C04B 28/006* (2013.01); *C04B 14/04* (2013.01); *C04B 14/041* (2013.01); *C04B 14/10* (2013.01); *C04B 14/42* (2013.01); *C04B 16/06* (2013.01); *C04B 16/0691* (2013.01); *C04B 2111/00017* (2013.01); *Y02P 40/165* (2015.11)

(58) Field of Classification Search
CPC ....... C04B 14/10; C04B 14/04; C04B 14/041; C04B 14/42; C04B 16/06; C04B 16/0691; C04B 28/006; C04B 2111/00017
See application file for complete search history.

(56) References Cited

U.S. PATENT DOCUMENTS

| 5,244,726 A * | 9/1993 | Laney ..................... C04B 16/06 106/601 |
| 2011/0132230 A1* | 6/2011 | Han ....................... C04B 12/005 106/600 |
| 2012/0024196 A1* | 2/2012 | Gong ...................... C04B 7/243 106/694 |
| 2012/0152153 A1* | 6/2012 | Gong .................... C04B 28/006 106/705 |
| 2012/0156381 A1 | 6/2012 | Allouche et al. |
| 2013/0087939 A1* | 4/2013 | Hill ...................... C04B 28/021 264/31 |
| 2013/0133555 A1* | 5/2013 | Lloyd ................... C04B 28/006 106/695 |

FOREIGN PATENT DOCUMENTS

| CN | 102633449 A * | 8/2012 | .......... C04B 28/006 |
| CN | 103641324 A * | 3/2014 | ............ C03C 11/00 |
| KR | 101078336 | 11/2011 | |

OTHER PUBLICATIONS

KR 101078336 B1 Kim Jong Young et al. (Nov. 1, 2011) Machine Translation into English.*
International Search Report in International Application No. PCT/BR2014/000452 dated Mar. 12, 2015.
Hao, et al., "Utilization of Solar Panel Waste Glass for Metakaolinite-Based Geopolymer Synthesis", Oct. 2013, pp. 797-803, vol. 32, No. 3, Environmental Progress & Sustainable Energy.
Shi, et al., "Mechanical properties and microstructure analysis of fly ash geopolymeric recycled concrete", 2012, pp. 20-29, Journal of Hazardous Materials.

* cited by examiner

Primary Examiner — Anthony J Green
(74) Attorney, Agent, or Firm — B. Aaron Schulman, Esq.; Stites & Harbison, PLLC

(57) ABSTRACT

"GEOPOLYMER CEMENT MADE FROM RECYCLED GLASS AND ITS MANUFACTURING PROCESS", the present invention relates to a geopolymer cement from recycled glass and its manufacturing process that, according to its characteristics, can produce geopolymer cement in its own and specific binding structure of a rigid solid type, made from recycled glass (waste), alkalis and water, and obtained directly by milling, homogenization, alkalinization and curing at room temperature, or forced curing of its components, and it can be used, in an extremely convenient, safe and cost-effective manner, as a new geopolymer matrix to replace the traditional ones made from metakaolin, blast furnace slag, fly ash or volcanic rock in various applications—to manufacture cement slabs, concrete, fiber composites and materials for coatings, aligned with an eco-friendly concept for complete reuse of this waste which is disposed in the environment.

2 Claims, No Drawings

GEOPOLYMER CEMENT PRODUCED FROM RECYCLED GLASS AND METHOD FOR PRODUCING SAME

The present invention relates to compounds for civil construction in general, more specifically to geopolymer cement from recycled glass and its manufacturing process that, according to its characteristics, can produce geopolymer cement in its own and specific binding structure of a rigid solid type, made from recycled glass (waste), alkalis and water, and obtained directly by milling, homogenization, alkalinization and curing at room temperature, or forced curing of its components—the major components of geopolymer cement are milled glass, alkali and water, and it can be used, in an extremely convenient, safe and cost-effective manner, as a new geopolymer matrix to replace the traditional ones made from metakaolin, blast furnace slag, fly ash or volcanic rock in various applications—to manufacture cement slabs, concrete, fiber composites and materials for coatings, aligned with an eco-friendly concept for complete reuse of this waste which is disposed in the environment and, and having as basis a high-strength, high-durability and high-precision geopolymer cement, which can be easily handled and applied to better fit the needs of users and ensure their safety, is quite affordable and, due to its general characteristics and composition, it is easily adaptable to a wide range of waste glass, locations and users in general, regardless of the characteristics that they may present.

Industrialization in general, in addition to enabling great economic progress in recent decades, has contributed to uncontrolled population growth, mainly in urban areas in less developed countries. As immediate result, we have increased consumption by the population and, therefore, more waste generation, which is usually not managed and disposed correctly, thus having direct and undesirable effects on the environment.

Currently, most of the waste generated in the cities goes to landfills, with major environmental impact, being of great concern to environmental engineers. The solution would be material recycling, creating job positions and income to a wide range of people. Seventy percent of the waste in landfills are estimated to construction materials and, of that total, up to eighty percent could be recycled, for example, glasses. The reuse of civil construction waste is still negligible, not to say nil, and can only grow if there is a good market that uses recycled waste safely.

In view of the foregoing, it is increasingly important that the society as a whole, especially companies and government agencies that package and treat solid waste in general, have versatile, convenient, safe, efficient and cost-effective structures to allow a broad, if not complete, reuse of the solid waste generated and mostly discarded in landfills, among which there is an enormous amount and variety of discarded glass.

Geopolymer cement, based on its name, can be defined as a binder system that hardens at room temperature, has properties to form strong chemical bonds with most of the rock aggregates, and can be manufactured from minimally processed natural materials or by-products, thus largely contributing to reduce carbon emissions into the atmosphere.

The geopolymer cement presents itself as an innovative material and a great alternative to the conventional Portland cement in civil construction, transportation infrastructure, among other fields, for example, in the manufacturing of concrete, primarily due to its ability to form strong chemical bonds with all kinds of rock aggregates.

Currently, natural aluminosilicate starting material is necessary for the production of traditional geopolymer cement, in addition to a compatible soluble alkaline reagent, such as sodium silicate or sodium and potassium hydroxides, and water. As an example of the main raw materials used in the production of conventional geopolymer cement, we can name: calcined kaolinite and laterite clays, volcanic rocks, mining waste and raw materials derived from industrial byproducts, such as blast furnace slag and fly ash from charcoal production.

In an extensive literature review in order to establish the current state of the art for geopolymer cements and their manufacturing process, object of this patent, no documents relevant to the state of the art were found the literature that are relative to the specific product claimed in this patent, i.e., geopolymer cement made from recycled glasses.

Whereas the main forming agent for geopolymer cements are amorphous materials, susceptible to the formation of a three-dimensional network of aluminosilicates, we propose a new inorganic amorphous matrix made from recycled glass to produce geopolymer cements and its by-products, which is a cheaper, from the energy consumption point of view, and environmentally friendly alternative for the production of cementitious materials, adding up to the current efforts dedicated to green residential buildings, whose main objective is to reduce $CO_2$ emissions by using materials with low energetic cost.

More specifically, we propose an alternative material to metakaolin (calcined kaolinite and laterite clays), volcanic rocks, blast furnace slag and fly ash, as the main forming agents of geopolymer cements, with the extra advantage of the material in question—recycled glass, no heat treatment needed for activation, since it has a substantially amorphous structure. Additionally, because it is industrial and domestic waste, often discarded directly in landfills, causing serious environmental problems and risks to human health, its elimination from the environment and the manufacturing of new materials would be an environmentally-friendly and effective alternative for this industrial waste, which is extremely important, especially considering that glass is not biodegradable.

Glass waste includes glass of various types, coming from different manufacturing processes, including flat, laminated or tempered glass, borosilicates, transparent or colored glass, incandescent or fluorescent light bulbs, packaging materials, or glass coming from stoning etc. i.e. any type of glass waste from industrial processes, civil construction or households. When correctly processed, glass waste can be turned into a new geopolymer matrix used to replace the traditional ones made from metakaolin, blast furnace slag or volcanic rock.

Therefore, the overall design of this geopolymer cement made from recycled glass and its manufacturing process, object of this invention, is entirely based on its simple and robust composition, with minimum components as possible, and simplified, safe, and streamlined use, combined with convenient manufacturing procedures, so as to produce convenient and effective geopolymer cement from glass waste which is usually discarded in the environment, it can form strong chemical bonds with most of the rock aggregates, and the quality of this bond in the aggregate geopolymer cement paste—when compared to that of the Portland cement, is much higher, as the latter needs porous transition rich in calcium hydroxide, which is a brittle and little resistant material.

It is worth noting that, no high temperature is necessary in the manufacturing of geopolymer cement. The very finely divided glass itself is the cementing raw material, unlike other geopolymer cements, i.e., it is possible to offer energy savings and reduce $CO_2$ emissions into the atmosphere—the main cause of the greenhouse effect. Compared to Portland cement clinker manufacturing process, which includes calcium carbonate calcination, i.e. $CO_2$ is released into the atmosphere as a pollutant, the polymer cement made from recycled glass is incredibly less polluting.

Similarly, the temperature accelerates the hardening process of the geopolymer cement, which reaches mechanical strength at an approximate compression rate of forty-one megapascals after treatment at sixty-five degrees Celsius for four hours, i.e., a faster curing process, where most of its resistance is gained over a period of twenty-four hours.

Therefore, the present invention gathers components and processes in a distinguished invention, which will meet the different demands of the task, i.e. manufacturing of geopolymer cement made from recycled glass. This invention ensures geopolymer cement of high efficiency, strength, functionality, versatility, durability, safety, integrity, reliability, and cost-effectiveness in view of its excellent technical qualities, providing advantages and better production and application of geopolymer cements, including in the recycling of solid waste, such as glass, and whose general characteristics differ from the other shapes and models known by the present state of the art.

The present invention relates to the use of a modern, efficient and accurate geopolymer cement made from recycled glass, and its manufacturing process includes a set of physicochemical and structural solutions correctly incorporated, creating a geopolymer cement in its own and specific binding structure, with a distinguished formulation in the rigid solid form, based on its characteristics, it is obtained by a specific process of milling, homogenization, alkalinization and curing (hardening) at room temperature or forced curing, and it is generally composed of recycled glass (waste), alkalis and water, at defined proportions, to enable an excellent composition of milled glass in the presence of alkalis and water, which is the essence of geopolymer cement, characterized by its high agglutinating properties that can form other materials for several different applications—manufacturing of cement slabs, concretes in general, fibrous composite materials and coating materials.

The present geopolymer cement is based on the application of components and processes in a distinguished invention, in order to achieve excellence in the obtaining and application process thereof, without, however, achieving a high degree of sophistication and complexity, making it possible to solve some of the major drawbacks of other forms and models known by the current state of the art and employed in producing geopolymer cements, which are located in an operating range where the forms and/or models are difficult to manufacture and use, are characterized by low efficiency and performance, cause very frequent accidents, have poor durability and strength, low versatility, complex mode of use, high losses, high air pollution, and high energy consumption.

The objectives, advantages and other important characteristics of this invention can be more easily understood when read together with the composition and manufacturing process.

This invention "Geopolymer Cement Made from Recycled Glass and its Manufacturing Process" relates to a geopolymer cement in a binding structure, with a general distinguished formulation in the rigid solid form, which, due to its own characteristics, is obtained by a specific process of milling, homogenization, alkalinization and curing (hardening) at room temperature or forced curing, and it is generally composed of recycled glass (waste), alkalis and water, at defined proportions, to enable an excellent composition of recycled glass to be used as an alternative to conventional Portland cement in various applications, being the formulation and, consequently, the amounts used, directly based on the intended applications.

The geopolymer cement made from recycled glass and its manufacturing process includes a general composition where the basic formulation includes a range of approximately forty-five to eighty percent recycled glass; half to five percent alkali; and twenty to fifty-five percent water, being all of the other geopolymer cement characteristics preserved.

The geopolymer cement made from recycled glass and its manufacturing process includes alkalis, which are potassium hydroxide or sodium hydroxide, being all of the other geopolymer cement characteristics preserved.

The geopolymer cement made from recycled glass and its manufacturing process includes a general composition where the basic formulation includes a range of twenty-five to thirty-five percent natural or synthetic mineral fillers, being all of the other geopolymer cement characteristics preserved.

The geopolymer cement made from recycled glass and its manufacturing process includes inert synthetic mineral fillers, which are aluminum oxide, zinc oxide or magnesium, being all of the other geopolymer cement characteristics preserved.

The geopolymer cement made from recycled glass and its manufacturing process includes inert natural mineral fillers, which are natural clay, silicates or aluminosilicates, being all of the other geopolymer cement characteristics preserved.

The geopolymer cement made from recycled glass and its manufacturing process can have inert fibrous materials—natural or synthetic fibers, being all of the other geopolymer cement characteristics preserved.

The geopolymer cement made from recycled glass and its manufacturing process includes a general composition where the basic formulation includes a range of one to five percent of inert fibrous materials—natural or synthetic fibers, being all of the other geopolymer cement characteristics preserved.

The geopolymer cement made from recycled glass and its manufacturing process includes inert fibrous materials—natural fibers, which are sawdust, cellulose fiber, rice hulls or sugarcane bagasse, being all of the other geopolymer cement characteristics preserved.

The geopolymer cement made from recycled glass and its manufacturing process includes inert fibrous materials—synthetic fibers, which are nylon, polypropylene, or glass fiber, being all of the other geopolymer cement characteristics preserved.

The geopolymer cement made from recycled glass and its manufacturing process can contain waste material from civil construction, being all of the other geopolymer cement characteristics preserved.

The geopolymer cement made from recycled glass and its manufacturing process includes a general composition where the basic formulation includes a range of one to five percent of civil construction waste, being all of the other geopolymer cement characteristics preserved.

The manufacturing process for geopolymer cement made from recycled glass is based on the perfect grinding, homogenization, alkalinization and curing (hardening) at room temperature or forced curing, i.e. a mixture of components having the rheological consistency of mortar that was cured at room temperature or at different temperatures to accelerate the process. Initially, recycled glass is milled until the material is finely ground. Subsequently, the basic components of the formulation: recycled glass, alkalis and water are homogenized, as well as other materials, such as natural or synthetic inert mineral fillers, natural or synthetic inert fibrous materials, natural or synthetic fibers, or waste materials from civil construction. Then, homogenized compounds are alkalinized using alkalis, such as potassium hydroxide and sodium hydroxide, and water, and a mortar is obtained. Lastly, the mortar is cured at room temperature for about twelve hours or at a higher temperature in a stove at sixty-five to seventy-five degrees Celsius for two to four hours, and a rigid solid material, the geopolymer cement, is obtained.

This geopolymer cement base made of, in weight, forty-five percent milled glass half to five percent alkalis, and twenty to fifty-five percent water, it has a mechanical resistance to compression of twenty to thirty megapascals after twelve hours of curing at room temperature. When cured in a stove at sixty-five to seventy-five degrees Celsius, compositions reach these values after a period of two hours, i.e., the temperature is an important variable to be considered when one desires to accelerate the curing process.

More specifically, to obtain the geopolymer cement, waste glass from a variety of sources should be milled to an appropriate particle size, being the fineness of the glass obtained after milling associated with its reactive power, i.e., the finer, the greater the rate of reaction with the alkalis in the geopolymerization process. Good reactivity is obtained with glass particles having an average size smaller than 250 μm to 1 μm. The fineness of the particles is a variable that depends on the type of geopolymer material to be manufactured, i.e. to be used as cementing compounds, surface finish, monolithic materials or composite materials. Thus, the glass finally divided after the milling step and alkalized with potassium hydroxide or sodium hydroxide, in the presence of water, gains consistency with the rapid increase in viscosity, and it is turned into a hard solid material after curing, with variable mechanical strength in function of Si:Al stoichiometry, the amount of water added, and the presence or not of inert mineral fillers. By adding alkalis, such as calcium hydroxide, with sodium hydroxide and sodium silicate, the curing process is accelerated and these substances increase the mechanical strength of the materials.

An example, which is not restrictive based on the invention claimed, includes geopolymer compositions which partially replace milled glass with inert materials (mineral fillers), where these can be manufactured having a minimum of forty-five to eighty percent milled glass as cementing agent, one to five percent alkalis, twenty-five to thirty-five percent mineral fillers, and water, in the stoichiometric ratio of thirty and fifty percent in weight. The mineral fillers used may be derived from natural starting materials, which are largely consisted of clay minerals, such as talc, kaolin, siltstone, quartzites, schist/shale, laterite soils, i.e. different silicates and/or aluminosilicates, and other natural materials, such as calcite or dolomite limestone, quicklime, which are inert natural starting materials. Alumina (aluminum oxide), zinc and magnesium oxides are synthetic inert materials, and can also be used in geopolymer compositions made from glass. Civil construction waste materials, duly milled for the production of mortars, concretes and other monolithic materials, can also be used. As these materials also have cementing materials in their composition, they have highly favorable characteristics regarding curing time and final mechanical strength.

Thus, when used in concrete, in addition to offering high strength in a relatively short period of time and being resistant to chemical corrosion, abrasion, thermal shock and high temperatures, its outperforms traditional concretes using Portland cement as binder.

The geopolymer cement made from recycled glass and its manufacturing process has the following specific advantages both in its manufacturing process and application: an effective alternative to conventional Portland cement; high energy savings in the manufacturing process; reduced $CO_2$ emissions into the atmosphere during manufacturing; reduced environmental pollution; does not require thermal treatment; high recycling capacity of glass, which is a non-biodegradable material; highly resistant to high temperatures, as facing sources of fire; great thermal and acoustic insulator; highly refractory; great binder—strong chemical bonds; and amorphous inorganic matrix.

In view of the foregoing, the present invention relates to a compound to be used in civil construction, which will be well received by users of Portland cements and geopolymer cements in general, because this geopolymer cement made from recycled glass and its manufacturing process has innumerous advantages, such as: can be manufactured and used with safety, reliability and quickness; high strength and overall durability, combined with a low degree of deterioration; great yielding and performance due to its overall design; high comfort, convenience and safety to users; totally affordable, with great cost-effectiveness; can be used in an easy and safe use by any users; high applicability range; adapts perfectly to a wide range of recycled glass; it is based on an eco-friendly concept; excellent formulation precision; and the guarantee of a geopolymer cement that fully complies with the legislation in force and the basic conditions needed for its application as a whole.

All of these attributes classify this geopolymer cement made from recycled glass and its manufacturing procedure into a fully versatile, effective, convenient and safe product to be applied directly in the form of cement as binder, as coating material (finishing), to bind different metal, mineral or plant materials, or traditional monolithic materials or composite materials, by all kinds of users and on the widest range of locations, regardless of the general characteristics these may have, being easy to use and handle, in addition to having high performance and excellent general characteristics; However, the amount of product used may vary according to the needs of each application.

The invention claimed is:

1. A manufacturing process for geopolymer cement made from recycled glass, comprising:
   (a) milling recycled glass until finely ground material is obtained;
   (b) homogenizing the recycled glass with alkalis, water and mineral fillers;
   (c) alkalinizing the homogenized compounds using alkalis and water, obtaining mortar; and
   (d) curing the mortar at room temperature for 12 hours, or in a stove at a temperature from 65° C. to 75 ° C. for 2 hours to 4 hours, and obtaining the geopolymeric cement in rigid solid material.

2. The manufacturing process for geopolymer cement made from recycled glass according to claim 1, wherein the mineral fillers are natural or synthetic mineral fillers.

* * * * *